(12) United States Patent
Tsirkin

(10) Patent No.: US 12,411,704 B2
(45) Date of Patent: Sep. 9, 2025

(54) EFFICIENT CENTRAL PROCESSING UNIT OVERCOMMIT FOR VIRTUAL MACHINES WITH SYMMETRIC MULTI-PROCESSING

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 746 days.

(21) Appl. No.: 17/702,090

(22) Filed: Mar. 23, 2022

(65) Prior Publication Data
US 2023/0305872 A1   Sep. 28, 2023

(51) Int. Cl.
*G06F 9/455* (2018.01)
*G06F 9/48* (2006.01)

(52) U.S. Cl.
CPC ........ *G06F 9/45558* (2013.01); *G06F 9/4812* (2013.01); *G06F 9/485* (2013.01)

(58) Field of Classification Search
None
See application file for complete search history.

(56) References Cited

U.S. PATENT DOCUMENTS

| | | | |
|---|---|---|---|
| 7,831,818 B2 * | 11/2010 | Moyer | G06F 11/3656 712/244 |
| 9,652,280 B2 | 5/2017 | Zheng | |
| 10,599,468 B2 | 3/2020 | Van Riel | |
| 10,949,243 B2 | 3/2021 | Tsirkin | |
| 11,126,474 B1 * | 9/2021 | Zidenberg | G06F 9/5016 |
| 2009/0157936 A1 * | 6/2009 | Goss | G06F 21/74 713/300 |
| 2013/0174148 A1 * | 7/2013 | Amit | G06F 9/327 718/1 |
| 2019/0266009 A1 | 8/2019 | Tsirkin | |
| 2020/0264995 A1 * | 8/2020 | Raisch | G06F 9/45558 |
| 2021/0216344 A1 | 7/2021 | Tsirkin | |

FOREIGN PATENT DOCUMENTS

WO   WO-2011072423 A1 *   6/2011   ............. G06F 13/24

OTHER PUBLICATIONS

L. Cheng & F.C.M. Lau, Offloading Interrupt Load Balancing from SMP Virtual Machines to the Hypervisor, IEEE Transactions on Parallel and Distributed Systems, vol. 27, No. 11, pp. 3298-3310, Nov. 1, 2016.
Zhao et al., Scheduler Activations for Interference-Resilient SMP Virtual Machine Scheduling, Middleware '17, Dec. 11-15, 2017, Association for Computing Machinery, Las Vegas, NV, USA.

* cited by examiner

*Primary Examiner* — Bradley A Teets
*Assistant Examiner* — Melissa A Headly
(74) *Attorney, Agent, or Firm* — Kilpatrick Townsend & Stockton LLP

(57) ABSTRACT

Efficient central processing unit overcommit for virtual machines with symmetric multi-processing may be provided by, in response to receiving a preemption-disable request on behalf of a virtual machine (VM) running on a physical central processing unit (PCPU), initiating a counter on the PCPU; in response to receiving a preempting task from a hypervisor to perform on the PCPU, checking a counter status for the counter; in response to the counter status being active: performing an ongoing task from the VM on the PCPU; and delaying performance of the preempting task until the counter status is inactive.

17 Claims, 4 Drawing Sheets

EFFICIENT CENTRAL PROCESSING UNIT OVERCOMMIT FOR VIRTUAL MACHINES WITH SYMMETRIC MULTI-PROCESSING

BACKGROUND

Virtualization allows a physical computing device to share computing resources among several users via Virtual Machines (VMs) running on the host hardware. Virtualization allows for greater system flexibility, and fuller usage of the underlying hardware as several VMs can schedule usage of the underlying hardware to account for dips and spikes in individual use rates.

Virtualization and scheduling may be achieved by running a layer, often referred to as a "hypervisor," above the hardware and below the VMs. A hypervisor may run directly on the server hardware without an operating system beneath it or as an application running under a traditional operating system. A hypervisor may represent the physical layer and provide interfaces between the underlying hardware and virtual devices of VMs via this representation. As the VMs may make use of the underlying hardware of the host machines, the VMs may use one or more Virtual Central Processing Units (VCPU or vCPU) assigned to one or more physical central processing units (PCPU or pCPU) with one or more cores that other VMs and system operations are also executed on. In some virtualization environments, the hypervisor represents a greater number of PCPUs to the collective VMs than the host system can provide at one time, which may be referred to as overcommit. Overcommit allows the VMs to use a greater percentage of system resources during certain computing operations when the other VMs are not scheduled to use those resources. When a VM is allowed to use two or more PCPUs simultaneously, that VM is said to have Symmetric Multi-Processing (SMP), and may be referred to as an SMP VM.

SUMMARY

The present disclosure provides new and innovative protections for critical read section operations, such as Read Copy Update (RCU) operations, in environments that offer Virtual Machines (VMs) with Virtual Central Processing Unit (VCPU) overcommit that result in improvements to in computing efficiency, easier synchronization among several VCPUs, and other benefits.

In one example, a method is provided that comprises in response to receiving a preemption-disable request on behalf of a virtual machine (VM) running on a physical central processing unit (PCPU), initiating a counter on the PCPU; in response to receiving a preempting task from a hypervisor to perform on the PCPU, checking a counter status for the counter; in response to the counter status being active: performing an ongoing task from the VM on the PCPU; and delaying performance of the preempting task until the counter status is inactive.

In one example, a system is provided that comprises a processor; and a memory including instructions that when executed by the processor perform operations comprising: in response to receiving a preemption-disable request on behalf of a virtual machine (VM) running on a physical central processing unit (PCPU), initiating a counter on the PCPU; in response to receiving a preempting task from a hypervisor to perform on the PCPU, checking a counter status for the counter; in response to the counter status being active: performing an ongoing task from the VM on the PCPU; and delaying performance of the preempting task until the counter status is inactive.

In one example, a memory device is provided that includes instructions that when executed by a processor perform operations comprising: in response to receiving a preemption-disable request on behalf of a virtual machine (VM) running on a physical central processing unit (PCPU), initiating a counter on the PCPU; in response to receiving a preempting task from a hypervisor to perform on the PCPU, checking a counter status for the counter; in response to the counter status being active: performing an ongoing task from the VM on the PCPU; and delaying performance of the preempting task until the counter status is inactive.

Additional features and advantages of the disclosed methods, devices, and/or systems are described in, and will be apparent from, the following Detailed Description and the Figures.

DETAILED DESCRIPTION

Figure 1:
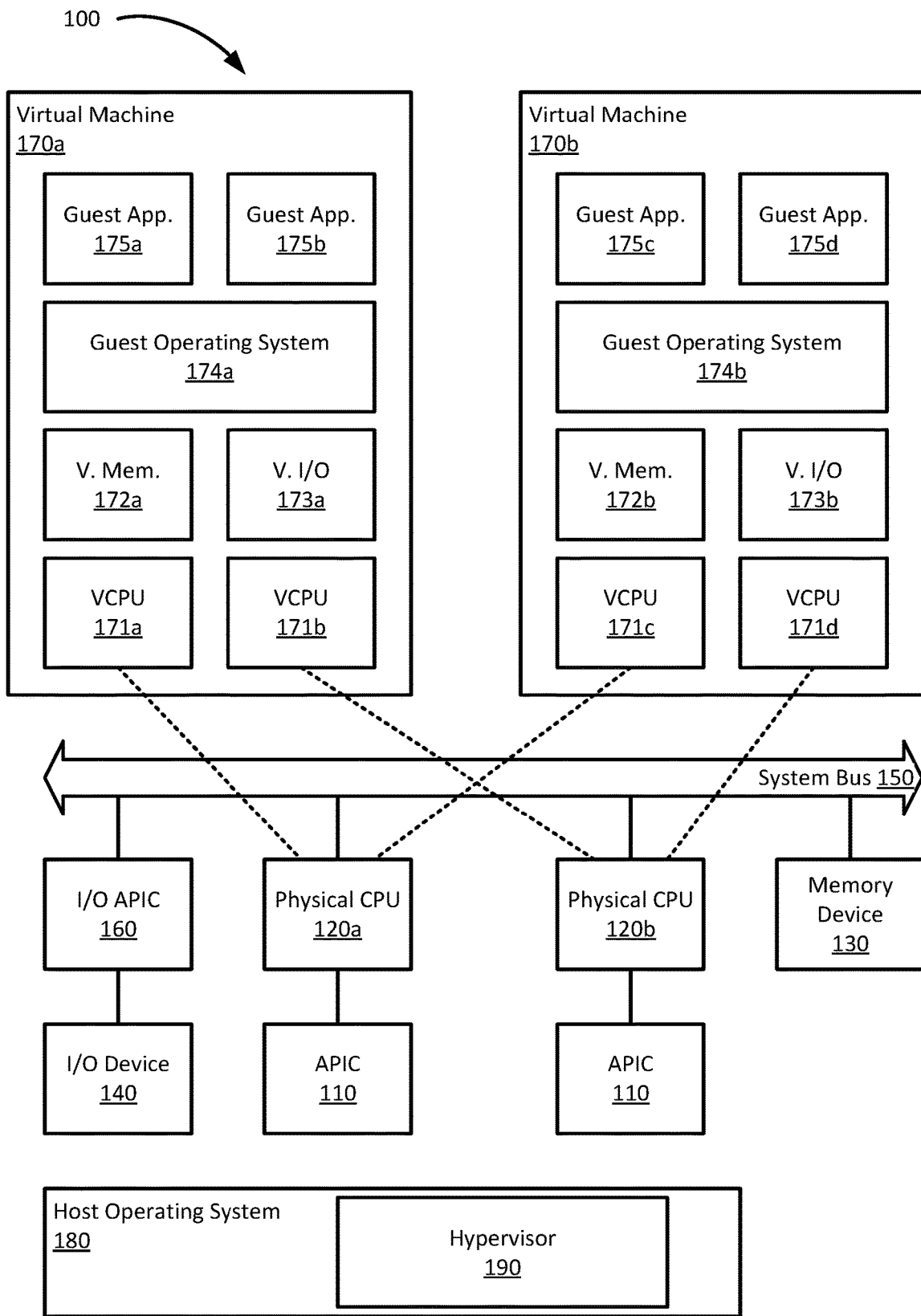
FIG. 1 illustrates a high-level component diagram of a computer system, according to examples of the present disclosure.

In a virtualization environment, overcommit allows one or more Virtual Machines (VMs) to have more Virtual Central Processing Units (VCPUs or vCPUs) than the underlying Physical Central Processing Units (PCPUs or pCPUs), or cores thereof, on the associated host machine. As the PCPUs may not be used to full capacity, the overcommit may be unnoticeable, or result in moderately slowed performance as a hypervisor in the virtualization environment adjusts which VCPU's processes are performed by the underlying PCPUs. However, many virtualization environments allow for multicore processing and operations on one core can affect when events on another core can take place, potentially leaving a VCPU "spinning" or waiting for an event from another VCPU to complete before proceeding. When a hypervisor or other operation de-schedules a first VCPU from operating on a first PCPU, various operations that use multiple synchronized processors may be affected with arbitrarily long wait times until the first VCPU is scheduled again.

When a VM is allowed to simultaneously access to multiple PCPUs to run tasks on, the VM may be referred to as having Symmetric Multi-Processing (SMP) enabled, and may be referred to as an SMP VM. When the virtualization environment includes SMP VMs and allows overcommit, some or all of the PCPUs used by the SMP VMs may be subject to interrupts or preempting tasks from other VMs sharing the PCPUs with the SMP VMs (which may be SMP or non-SMP VMs). When an SMP VM is interrupted on a first PCPU, other PCPUs relying on the output of the first PCPU or attempting to synchronize with the first PCPU can observe frequent or lengthy periods of latency.

However, if an SMP VM is allowed to block or otherwise disable interrupts or preemption from a hypervisor (e.g., on behalf of another VM sharing a PCPU with the SMP VM), the SMP VM may unfairly monopolize use of the PCPU, whether due to a malicious agent, a hang or bug in the code for the SMP VM, or selfishness, which reduces the overall efficiency of the virtualization environment and may affect the reliability of the virtualization environment for other users. Accordingly, allowing a guest (e.g., a VM) to disable host interrupts (e.g., from the hypervisor or on behalf of another guest) requires trust that the guest will re-enable host interrupts in a timely manner, otherwise the virtualization environment may be unable to properly allocate resources among several guests.

The present disclosure therefore provides techniques to avoid synchronization issues in a virtualization environment in which overcommit is permitted with SMP VMs, thereby solving a computer-centric problem and improving the efficiency of the underlying computing devices. Modifications to one or more the PCPUs, hypervisor, and Operating Systems (OS) of the VMs (also referred to as guest OSes) to affect hypervisor preemption are provided to enforce temporary disabling of hypervisor preemption. A counter is set on the PCPUs when an SMP VM enters (or schedules entry to) a critical-section operation that cannot be interrupted without disrupting operations of the SMP VM, such as, for example, a Read-Copy-Update (RCU) operation or an operation synchronized across multiple CPUs. Any preempting tasks received while the counter is in an active state are delayed until the counter expires when a timeout condition occurs or is cleared by the disabling entity (e.g., re-enabling preemption before the counter would expire). Accordingly, the present disclosure allows for the guests to selectively disable hypervisor preemption of certain tasks, while ensuring that the hypervisor can eventually reinstate preemption outside of critical-sections of those certain tasks.

FIG. 1 illustrates a high-level component diagram of a computer system 100, according to examples of the present disclosure. The computer system 100 may include one or more physical central processing units (PCPUs) 120a-b (generally or collectively, processors or PCPUs 120) communicatively coupled to memory devices 130, and input/output (I/O) devices 140 via a system bus 150.

In various examples, the PCPUs 120 may include various devices that are capable of executing instructions encoding arithmetic, logical, or I/O operations. In an illustrative example, a PCPU 120 may follow Von Neumann architectural model and may include an arithmetic logic unit (ALU), a control unit, and a plurality of registers. In another aspect, a PCPU 120 may be a single core processor which is capable of executing one instruction at a time (or process a single pipeline of instructions), or a multi-core processor which may simultaneously execute multiple instructions. In another aspect, a PCPU 120 may be implemented as a single integrated circuit, two or more integrated circuits, or may be a component of a multi-chip module (e.g., in which individual microprocessor dies are included in a single integrated circuit package and hence share a single socket).

In various examples, the memory devices 130 include volatile or non-volatile memory devices, such as RAM, ROM, EEPROM, or any other devices capable of storing data. In various examples, the memory devices 130 may include on-chip memory for one or more of the PCPUs 120.

In various examples, the I/O devices 140 include devices providing an interface between a PCPU 120 and an external device capable of inputting and/or outputting binary data.

The computer system 100 may further comprise one or more Advanced Programmable Interrupt Controllers (APIC), including one local APIC 110 per PCPU 120 and one or more I/O APICs 160. The local APICs 110 may receive interrupts from local sources (including timer interrupts, internal error interrupts, performance monitoring counter interrupts, thermal sensor interrupts, and I/O devices 140 connected to the local interrupt pins of the PCPU 120 either directly or via an external interrupt controller) and externally connected I/O devices 140 (i.e., I/O devices connected to an I/O APIC 160), as well as inter-processor interrupts (IPIs).

In a virtualization environment, the computer system 100 may be a host system that runs one or more virtual machines (VMs) 170a-b (generally or collectively, VM 170), by executing a hypervisor 190, often referred to as "virtual machine manager," above the hardware and below the VMs 170, as schematically illustrated by FIG. 1. In one illustrative example, the hypervisor 190 may be a component of a host operating system 180 executed by the host computer system 100. Additionally or alternatively, the hypervisor 190 may be provided by an application running under the host operating system 180, or may run directly on the host computer system 100 without an operating system beneath it. The hypervisor 190 may represent the physical layer, including PCPUs 120, memory devices 130, and I/O devices 140, and present this representation to the VMs 170 as virtual devices.

Each VM 170a-b may execute a guest operating system (OS) 174a-b (generally or collectively, guest OS 174) which may use underlying VCPUs 171a-d (generally or collectively, VCPU 171), virtual memory 172a-b (generally or collectively, virtual memory 172), and virtual I/O devices 173a-b (generally or collectively, virtual I/O devices 173). A number of VCPUs 171 from different VMs 170 may be mapped to one PCPU 120 when overcommit is permitted in the virtualization environment. Additionally, each VM 170a-b may run one or more guest applications 175a-d (generally or collectively, guest applications 175) under the associated guest OS 174. The guest operating system 174 and guest applications 175 are collectively referred to herein as "guest software" for the corresponding VM 170.

In certain examples, processor virtualization may be implemented by the hypervisor 190 scheduling time slots on one or more PCPUs 120 for the various VCPUs 171a-d. In an illustrative example, the hypervisor 190 implements the first VCPU 171a as a first processing thread scheduled to run on the first PCPU 120a, and implements the second VCPU 171b as a second processing thread scheduled to run on the first PCPU 120a and the second PCPU 120b. When the hypervisor 190 allows a VM 170 to simultaneously run two or more VCPUs 171 on two or more PCPUs 120, that VM 170 may be referred to as an SMP VM 170. For example, when the processing threads of the first VCPU 171a and the second VCPU 171b are scheduled at overlapping times, the first VM 170a may be identified as an SMP VM 170.

Device virtualization may be implemented by intercepting virtual machine memory read/write and/or input/output (I/O) operations with respect to certain memory and/or I/O port ranges, and by routing hardware interrupts to a VM 170 associated with the corresponding virtual device. Memory virtualization may be implemented by a paging mechanism allocating the host RAM to virtual machine memory pages and swapping the memory pages to a backing storage when necessary.

Figure 2A:
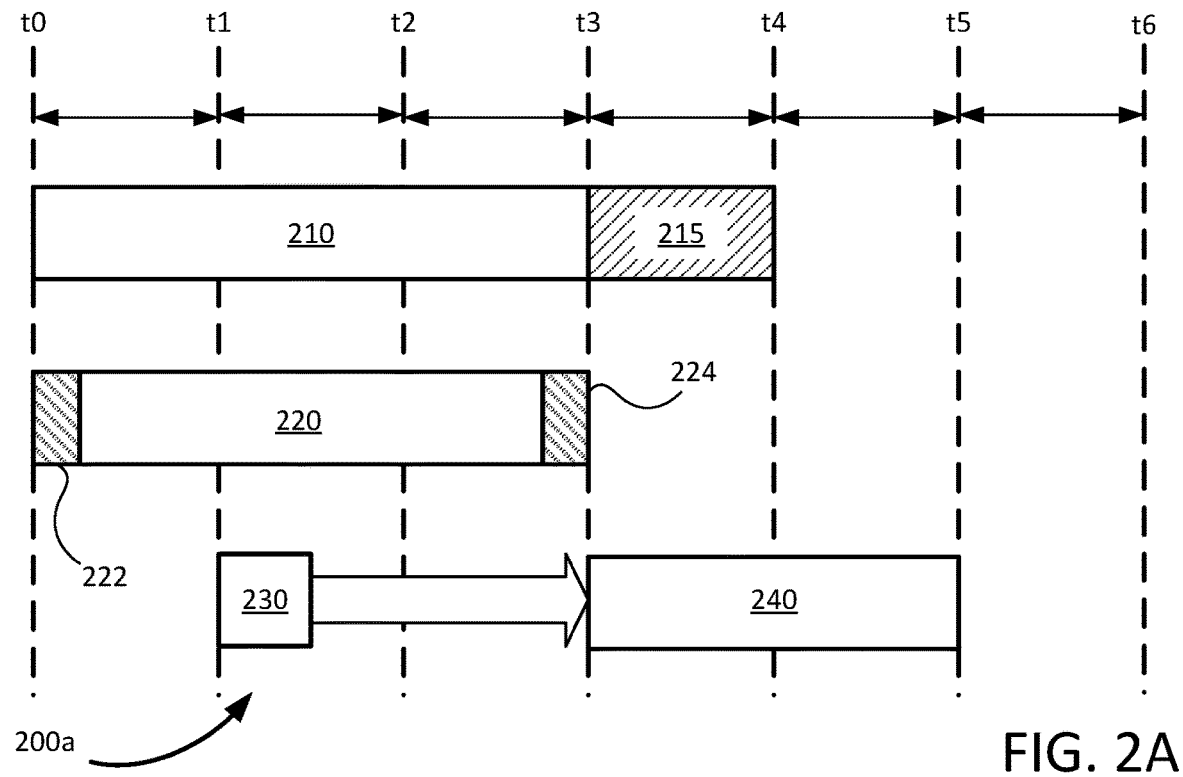
FIGS. 2A and 2B illustrate timing diagrams for temporarily disabling hypervisor preemption, according to examples of the present disclosure.
Figure 2B:
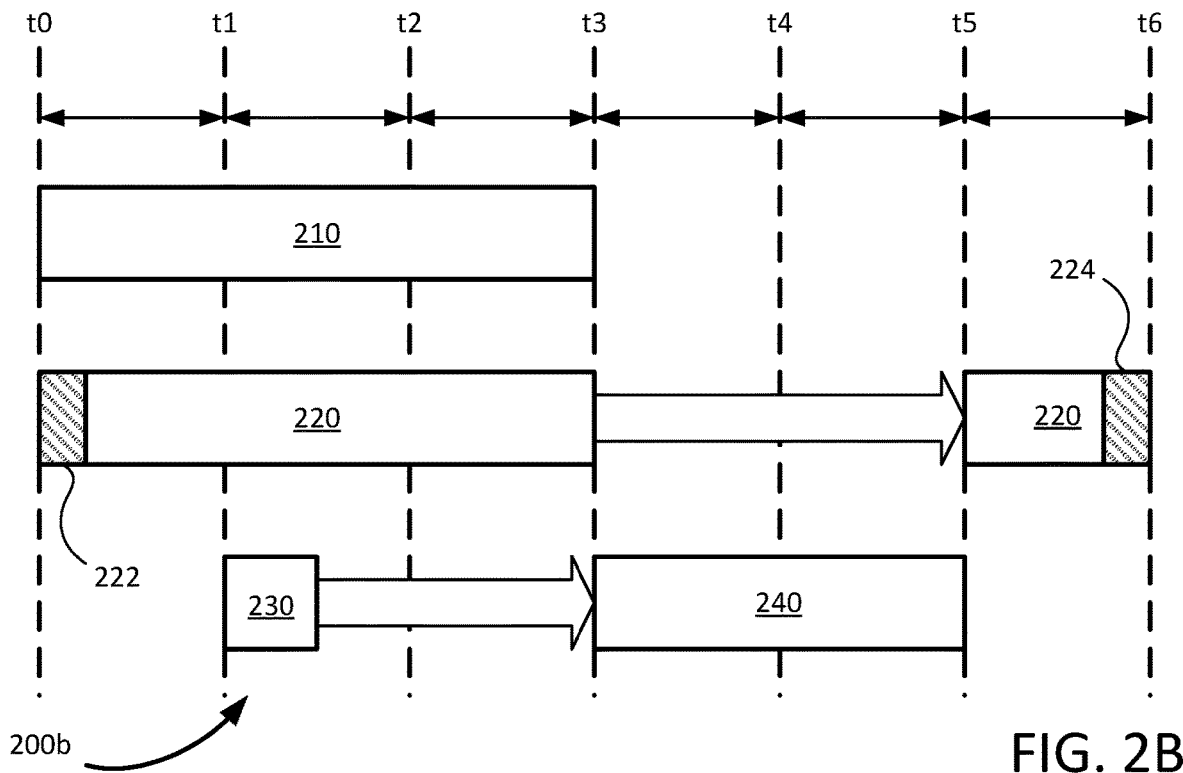

FIGS. 2A and 2B illustrate timing diagrams 200a, 200b for temporarily disabling hypervisor preemption, according to examples of the present disclosure. In each of the timing diagrams 200a, 200b, a period of time is shown with several substantially equal divisions defined therein. In various embodiments, time may be measured in milliseconds (ms) (e.g., each division of time between $t_x$ and $t_{x+1}$=Y ms) or in clock cycles for the underlying PCPU 120 on which the operations are performed (e.g., each division of time between $t_x$ and $t_{x+1}$=Y cycles).

FIG. 2A illustrates a first timing diagram 200a in which an ongoing task 220 that set a counter 210 completes before the counter 210 expires. When a preemption request 230 is received for use of the PCPU 120 that is executing the ongoing task 220 while the counter 210 is active, the PCPU 120 delays executing the associated preempting task 240 (e.g., hypervisor interrupt, a VM exit). Once the ongoing task 220 completes, the counter 210 is cleared or set to an inactive status; surrendering any excess 215 time or cycles initially reserved by the counter 210 that is not needed for execution of the ongoing task 220. For example, the counter 210 may initially be set to be active from time $t_0$ to time $t_4$, but if the ongoing task 220 is able to be executed between time $t_0$ and $t_3$, the time between $t_3$ and $t_4$ may be considered excess 215. The amount of time or cycles that the counter 210 is initially set to may be predefined by the hypervisor 190 based on the current status of the computing environment, and may vary based on changes to the status of the computing environment.

FIG. 2B illustrates a second timing diagram 220b in which a counter 210 expires before an ongoing task 220 completes. When a preemption request 230 is received for use of the PCPU 120 that is executing the ongoing task 220 while the counter 210 is active, the PCPU 120 delays executing the preempting task 240. However, if the counter 210 expires, reaches a time-out condition, or is otherwise set to an inactive status before the ongoing task 220 completes, the counter 210 is cleared and the preempting task 240 is allowed to execute on the PCPU 120; interrupting the original ongoing task 220. The hypervisor 190 may reschedule the ongoing task 220 to resume once the preempting task 240 is complete. For example, the counter 210 may initially be set to be active from time $t_0$ to time $t_3$, but if the ongoing task 220 is not complete by $t_3$, the counter 210 expires, and the preempting task 240 is executed. In various examples, the PCPU 120 may immediately resume the interrupted ongoing task 220 in response to the preempting task 240 completing, or may wait until a later time to resume the interrupted ongoing task 220 (e.g., allowing intervening tasks to be executed).

To temporarily disable hypervisor preemption when protection is needed for a critical-section operation, the counter 210 is set at the beginning of an active time period. For example, an interrupt-disable instruction or function 222 included in the ongoing task 220 may set the counter 210 to an active status. In various examples, the interrupt-disable instruction or function 222 may be the initial instruction or function of the ongoing task 220, but may also be an initial instruction or function to a critical-section of the ongoing task 220, where other instructions or functions occur before the interrupt-disable function 222 as part of the ongoing task 220. As used herein, a "critical-section" refers to a portion of a task that uses mutually exclusive or atomic access to a resource (e.g., a data structure, peripheral device, network connection) and, if interrupted, would result in erroneous behavior in the ongoing task 220 or additional tasks scheduled across multiple VCPUs 171 in a VM 170 (e.g., a dependent or parent task). Read-Copy-Update (RCU) operations are one example of an ongoing task 220 that may be performed on a single processor that includes a critical-section, but other operations that are synchronized between two or more processors or access other exclusive devices or data structure may also have critical-sections that lock up access to the exclusive devices or data structures until the process is allowed to complete.

In various examples, the counter 210 may be set to various different initial values by different ongoing tasks 220, or may be set to a fixed initial value by all of the ongoing tasks 220. In some, various VMs 170 may be allowed to set different initial values for the counter 210 so that some VMs 170 are allowed longer times to disable hypervisor preemption for than other VMs 170 (e.g., based on a class or category of VM 170). Similarly, the hypervisor 190 may adjust the initial values that a certain VM 170 can set for the counter 210 so that different classes or categories of VMs 170 can disable hypervisor preemption for different time periods, to shorten or lengthen how long hypervisor interrupts can be disabled for based on processor demand on the host device, or to prevent or discourage one VM 170 from submitting more than N critical-section operations within a given time period. The initial value may be hard-coded into the interrupt-disable function 222 or may be pointer in memory that points to a function that sets the initial value for the counter 210 as an output.

In some examples, the interrupt-disable function 222 also includes a check for whether the VM 170 attempting to execute the associated ongoing task 220 is an SMP VM 170 or a non-SMP VM 170. Accordingly, the interrupt-disable function 222 disables hypervisor preemption and sets the counter 210 to an active status on the condition that the VM 170 is an SMP VM 170. Otherwise, when the VM 170 is a non-SMP VM 170, the interrupt-disable function 222 executes, but does not set the counter 210 to an active status or otherwise disable hypervisor preemption.

The counter 210 may decrement until a timeout condition occurs, or may be actively reset to an inactive state by a releasing function 224. To actively re-enable hypervisor preemption when protection is no longer needed (and before the counter would otherwise expire or timeout), the ongoing task 220 concludes with a releasing instruction or function 224. In various examples, the releasing instruction or function 224 may be the final instruction of the ongoing task 220, but may also be a final instruction or function to a critical-section of the ongoing task 220, where additional instructions or functions occur after the releasing function 224 as part of the ongoing task 220. When the counter 210 is already expired, as in FIG. 2B, the releasing function 224 may still be performed, and the status of the counter 210 remains inactive.

In various examples, the interrupt-disable function 222 or releasing function 224, may be explicitly included as instructions in the ongoing task 220 by a guest OS 174. Additionally or alternatively, the instruction set on the PCPU 120 is modified to include the interrupt-disable function 222 and releasing function 224 so that corresponding instructions received from the VCPUs 171 are performed with the corresponding requests for disabling and re-enabling of hypervisor preemption.

In some examples, the guest OS 174 is modified to include the interrupt-disable function 222 and releasing function 224 in function calls that would disable or re-enable guest interrupts, or in any function call that includes a critical-section.

In some examples, the hypervisor 190 is modified to notify the VMs 170 of the availability for the VMs 170 to (temporarily) disable hypervisor preemption and the lengths (in predefined amounts of time or cycles) that the counter 210 can be active for. Additionally or alternatively, the hypervisor 190 notifies the VMs 170 when hypervisor preemption has been (temporarily) disabled on one or more of the PCPUs 120 used by those VMs 170 by other VMs 170 in the computing environment.

Figure 3:
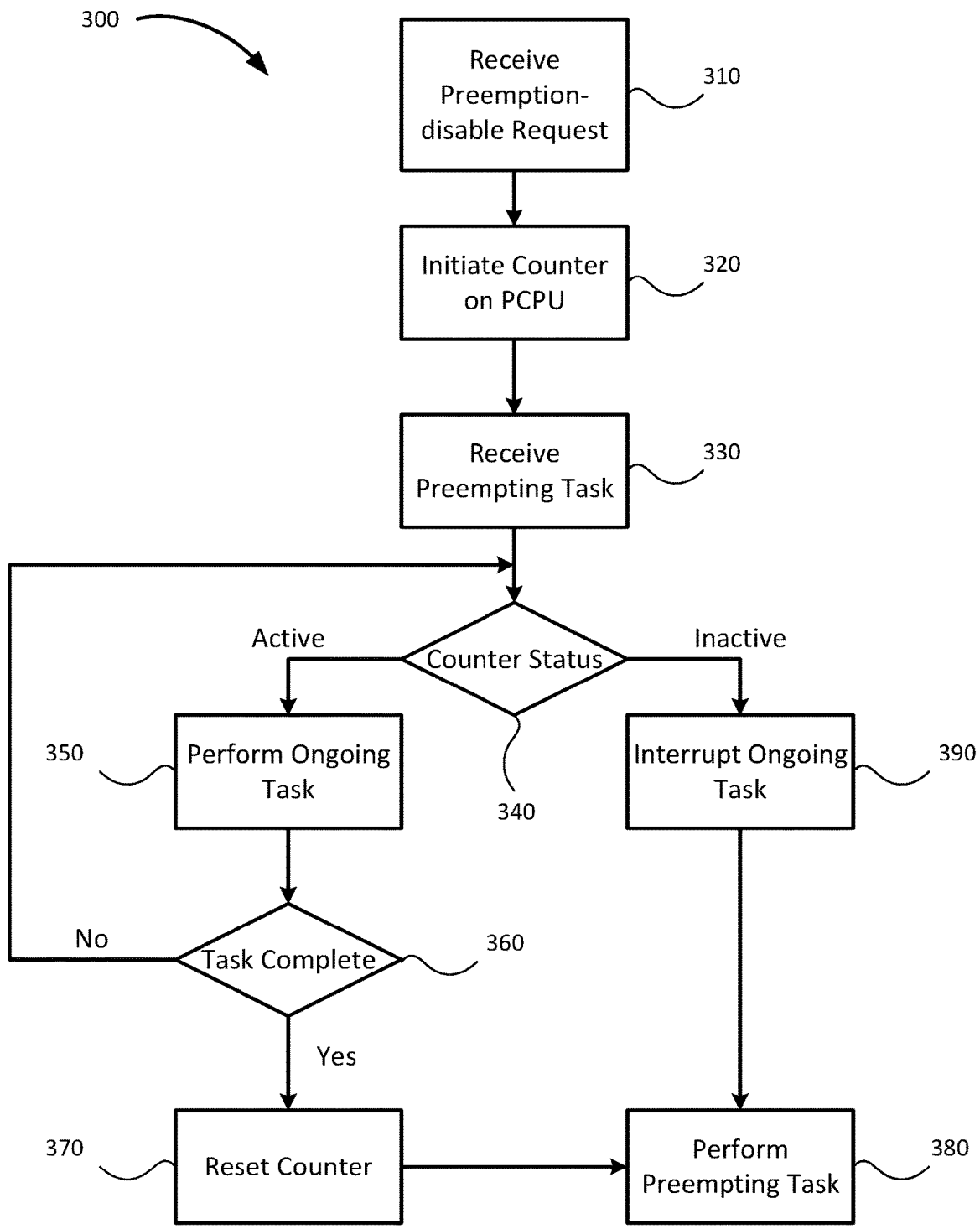
FIG. 3 is a flowchart of a method for providing efficient processor overcommit for Symmetric Multi-Processing Virtual Machines, according to examples of the present disclosure.

FIG. 3 is a flowchart of a method 300 for providing efficient PCPU 120 overcommit for SMP VMs 170, according to examples of the present disclosure. Method 300 begins at block 310, where an interrupt-disable request is received for an ongoing task 220 to be executed for a VM 170 running on a PCPU 120 (e.g., from an associated VCPU 171) to temporarily disable the hypervisor 190 from interrupting ongoing tasks 220 being performed on the PCPU 120. In various examples, the decision to send an interrupt-disable request may be made based on the ongoing task 220 including or entering a critical-section, or based on both the VM 170 being an SMP VM 170 and the ongoing task 220 including or entering a critical-section.

In various examples, disabling hypervisor preemption may be unconditional for the set of potential ongoing tasks 220 or may be made conditional on the status of the requesting VM 170 being an SMP VM 170. For example, an RCU task may unconditionally disable hypervisor preemption so that a first VM 170a (with SMP disabled) and a second VM 170b (with SMP enabled) both generate an interrupt-disable request when initiating an RCU task. In an additional example, an ongoing task 220 may conditionally disable hypervisor preemption when entering a critical-section so that a first VM 170a (with SMP disabled) does not generate an interrupt-disable request when initiating the ongoing task and a second VM 170b (with SMP enabled) does generate an interrupt-disable request when initiating the ongoing task 220.

In some examples, the interrupt-disable request affects the one PCPU 120 running the VCPU 171 from with the ongoing task 220 is received, but may also affect one or more additional PCPUs 120 that are running the other VCPUs 171 for a shared VM 170. For example, when a VM 170 includes a first VCPU 171a and a second VCPU 171b a corresponding first PCPU 120a and second PCPU 120b, each PCPU 120a-b can receive the interrupt-disable request generated by one of VCPU 171a or VCPU 171b to temporarily disable hypervisor preemption in parallel on each PCPU 120 used by the VM 170.

At block 320, in response to the interrupt-disable function 222 (received per block 310), the PCPU 120 initiates a counter 210. In some examples, the PCPU 120, the hypervisor 190 or the VCPU 171 may set different values for the counter 210 to specify how long to disable hypervisor preemption in different situations. In various examples, the initial value for the counter 210 may be based on one or more of: the type or category of the entity that initiated disabling hypervisor preemption, how long ago the entity last disabled hypervisor preemption, how many PCPUs 120 across the host computer system 100 currently have hypervisor preemption disabled, how many PCPUs 120 will be affected by the current request for disabling hypervisor preemption, the current workload (e.g., PCPU 120 usage rate) in the host computer system 100, and the like. In various examples, the value set in the counter 210 may be set programmatically or via a function to account for changes in the situation and circumstances in the host computer system 100.

At block 330, the PCPU 120 receives a preempting task 240 from the hypervisor 190. In various examples, the preempting task 240 may originate from a different VM 170 than the VM 170 that requested that hypervisor preemption be disabled (per block 310) or from the host OS 180. The preempting tasks 240 may be any thread, task, or operation that would ordinarily be given higher priority access to the PCPU 120 that would interrupt an ongoing task 220 being performed on behalf of the VCPU 171 from which the interrupt-disable request was received.

At block 340, the PCPU 120 determines whether the counter status of the counter 210 is active or inactive. When the counter status is active (e.g., the counter 210 is counting down), method 300 proceeds to block 350. Otherwise, when the counter status is inactive (e.g., the counter 210 has reached a zero or resting state), method 300 proceeds to block 380.

At block 350, the PCPU 120 performs the ongoing task 220, thereby delaying performance of the preempting task 240. In various examples, the PCPU 120 may perform the ongoing task 220 for a predefined number of clock cycles or a predefined amount of time before reevaluating at block 360 whether the ongoing task 220 is complete. The amount of time or number of clock cycles between each evaluation may be constant (e.g., check every X clock cycles or Y ms) or may vary based on one or more of: the type or category of the entity that initiated disabling hypervisor preemption, how long ago the entity last disabled hypervisor preemption, how many PCPUs 120 across the host computer system 100 currently have hypervisor preemption disabled, how many PCPUs 120 are affected by the current request for disabling hypervisor preemption, the current workload (e.g., PCPU 120 usage rate) in the host computer system 100, and the like. When the ongoing task 220 completes, method 300 proceeds to block 370. When the ongoing task 220 is not complete, method 300 returns to block 340 to re-determine whether the preempting task 240 (received per block 330) is now allowed to interrupt the ongoing task 220 based on the counter status.

At block 370, the PCPU 120 resets the counter 210 to have an inactive counter status (e.g., zeroing the counter 210). In some examples, the counter status is set to inactive in response to the ongoing task 220 completing a synchronization critical-section (which may also conclude the ongoing task 220), the ongoing task 220 completing execution, or the counter 210 decrementing to a zero or inactive state. In various examples, when multiple counters 210 were set on corresponding PCPUs 120 to disable hypervisor preempting in parallel across the PCPUs 120 used by a VM 170, the PCPU 120 performing the ongoing task 220 for which preemption was disabled signals the other PCPUs 120 to reset the corresponding counters 210 to re-enable hypervisor preemption in parallel.

At block 380, the PCPU 120 performs the preempting tasks 240 (received per block 330). In various examples, if the ongoing task 220 was interrupted, the PCPU 120 reschedules the remaining portion of the ongoing task 220 to resume after the preempting task 240 completes, or may reschedule the remaining portion to be completed at a later time with one or more intervening tasks occurring before resuming execution.

At block 390, the PCPU 120 interrupts the ongoing tasks 220. In various examples, when interrupting the ongoing task 220, the PCPU 120 may mark any remaining portion of the ongoing task 220 for immediate resumption once the preempting task 240 is complete, or may mark the remaining portion of the ongoing task 220 for resumption some time after the preempting task 240 is complete (e.g., to account for any other preempting or higher-priority tasks initially blocked by the ongoing task 220). Method 300 then proceeds to block 380 to perform the preempting task 240.

Figure 4:
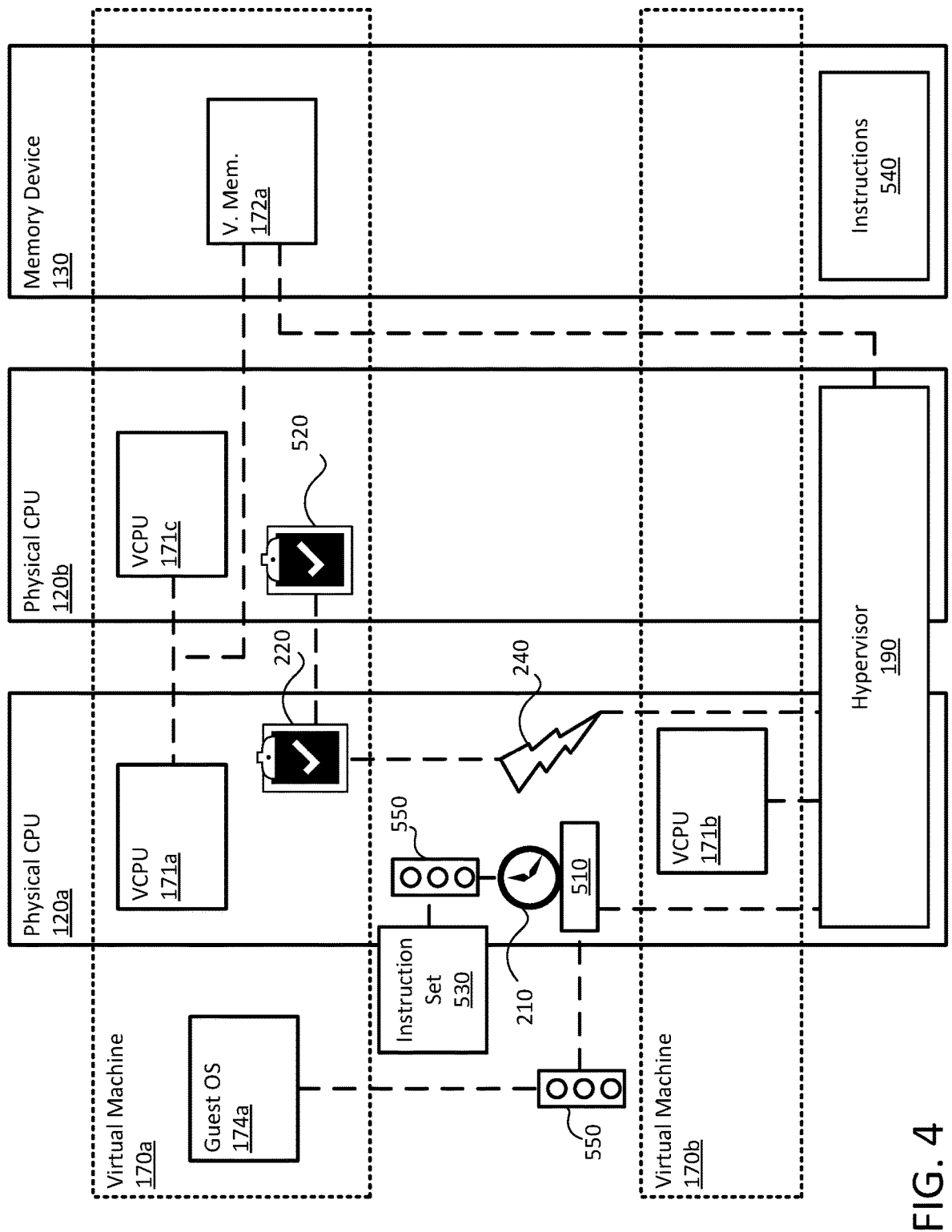
FIG. 4 is a diagram of a system that provides efficient processor overcommit for Symmetric Multi-Processing VMs, according to examples of the present disclosure.

FIG. 4 is a diagram of a system that provides efficient PCPU 120 overcommit for SMP VMs 170, according to examples of the present disclosure. The system includes one or more processors (e.g., the PCPUs 120) and memories (e.g., a memory device 130) on which various VMs 170 are provided. The memory includes instructions 540 that, when executed by one or more of the processors, perform the various operations described in the present disclosure.

When the total number of VCPUs 171 outnumber the total number of PCPUs 120 in the system, the system is said to be in an overcommitted state. When one VM 170, such as the first VM 170a, is permitted access to multiple processors simultaneously, such as via the first VCPU 171a running on the first PCPU 120a and the third VCPU 171c running on the second PCPU 120b, that VM 170 is said to be an SMP VM 170. In various examples, some or all of the VMs 170 provided by the system may be SMP VMs 170 (such as the first VM 170a with the first VCPU 171a and the third VCPU 171c) or may be non-SMP VMs 170 (such as the second VM 170b with the second VCPU 171b), and various VMs 170 may transition between being SMP VMs 170 and non-SMP VMs 170 at various times.

In various examples, preempting tasks 240, originating directly or indirectly from the hypervisor 190 (e.g., from a VCPU 171 associated with a different VM 170 than the VM 170 from which the ongoing task 220 originated from), can be scheduled for execution on one PCPU 120 being used by an SMP VM 170 that may interrupt an ongoing task 220. Because the ongoing task 220 may be synchronized with an external task 520 originating from the same VM 170, but running on a different PCPU 120 (e.g., via the third VCPU 171c), the preempting tasks 240, if allowed to interrupt the ongoing task 220, could cause delays on multiple PCPUs 120 in the system. Similarly, if the preempting tasks 240 are allowed to interrupt an ongoing task 220 that includes several threads referencing a shared data structure on a single PCPU 120 (e.g., an RCU operation on the first PCPU 120a), the timing of when the preempting task 240 is executed can waste computing resources on that PCPU 120 as threads wait for resources to be released, and thereby reduce the efficiency of the system.

To provide seamless support for SMP VMs 170 when the systems allows for overcommit, various modifications are made to one or more of the instruction sets 530 of the PCPUs 120, the hypervisor 190, and the guest OS 174 to allow for the temporary disabling of hypervisor preemption to thereby avoid wasting computing resources due to untimely preempting tasks 240 and improve the efficiency of the system.

In various examples, the instruction set 530 includes new instructions that allow the PCPU 120 to enable or disable hypervisor preemption (e.g., via hypervisor interrupts, VM exits, etc.) to set, start, stop, and otherwise adjust a counter status 510 for a counter 210 that temporarily allows an ongoing task 220 to delay preempting tasks 240. When the instruction set 530 is modified, the PCPU 120 may reinterpret various operations to perform on behalf of the VCPUs 171 to include a preemption-disable request or preemption-enable request (generally, a preemption request 550) to respectively disable or enable hypervisor preemption on the PCPU 120 according to the counter 210.

In various examples, the hypervisor 190 is modified to configure, before entering a VM 170, the counter status 510 and to notify the guest OS 174 about the ability to disable and re-enable hypervisor preemption on the PCPUs 120. In various examples, the hypervisor 190 provides an initial counter value to use for the counter 210 (e.g., setting how long hypervisor preemption can be disabled for), which may be adjusted based on various operational conditions in the system. This value may be stored in the virtual memory 172 of the notified VMs 170, the instructions 540 for providing the system, or locally on the PCPU 120. The hypervisor 190 may notify the guest OS 174 of the ability to generate preemption requests 550 based on a positive determination of one or more of the associated VM 170 being an SMP VM 170 (or potential SMP VM 170) and the VM 170 using a PCPU 120 shared with another hardware or software task.

In various examples, the guest OS 174 is modified to generate preemption requests 550 when entering or exiting a critical-section for an ongoing task 220. In some examples, the guest OS 174 or the instruction set 530 are modified to generate preemption requests 550 when guest interrupts are respectively locally enabled or disabled (e.g., to prevent the second VCPU 171b from interrupting the first VCPU 171a locally by the first VM 170a).

With the system configured with one or more of the described modifications to the instruction set 530, hypervisor 190, and guest OS 174 (of all or a subset of the available guest OSes 174), computing resources can be conserved to allow completion of an ongoing task 220 in a critical-section without the risk of a guest monopolizing (intentionally or unintentionally) the PCPU 120. Accordingly, when hypervisor preemption is requested to perform a preempting task 240 (e.g., a hardware interrupt, a hypervisor task, or a task from a second VCPU 171b sharing the PCPU 120), the counter 210 delays performance of the preempting task 240 to allow an ongoing task 220 to complete, and thereby free up computing resources on the PCPU 120 or on other PCPUs 120 used by the VM 170 associated with the ongoing task 220. Because hypervisor preemption is disabled via a counter 210 that the PCPU 120 decrements over time, if the requesting VM 170 is buggy, attempting to monopolize the PCPU 120, or the ongoing task 220 otherwise is taking too long to complete, hypervisor preemption is automatically re-enabled at the expiration of the counter 210 in addition to or instead of when the VM 170 explicitly sets the counter status 510 to inactive via a preemption-disable request 550.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the examples described herein will be apparent to those skilled in the relevant art. Such changes and modifications can be made without departing from the spirit and scope of the present subject matter and without diminishing its intended advantages. It is therefore intended that such changes and modifications be covered by the appended claims.

What is claimed is:

1. A method performed by a computer system, the method comprising:
   receiving a preemption-disable request on behalf of a virtual machine (VM) running on a physical central processing unit (PCPU);
   determining that the VM is a Simultaneous Multi-Processing (SMP) VM;
   in response to receiving the preemption-disable request and determining that the VM is a SMP VM, initiating a counter on the PCPU to a counter value, wherein the counter value is dynamically determined by the computer system based on one or more factors;
   in response to receiving a preempting task from a hypervisor to perform on the PCPU, checking a counter status for the counter; and
   in response to the counter status being active:
      performing an ongoing task from the VM on the PCPU; and
      delaying performance of the preempting task until the counter status is inactive.

2. The method of claim 1, wherein the counter status is set to inactive in response to a timeout condition occurring a predefined amount of time or cycles after the preemption-disable request was received.

3. The method of claim 1, wherein the counter status is set to inactive in response receiving a preemption-enable request associated with the ongoing task completing a critical-section.

4. The method of claim 1, further comprising, after the counter status is set to inactive:
   in response to receiving a second preempting task from the hypervisor to perform on the PCPU while a second ongoing task is being executed on the PCPU, checking the counter status;
   in response to the counter status being inactive:
      interrupting the second ongoing task;
      performing the second preempting tasks; and
      rescheduling the PCPU to resume performing the second ongoing task.

5. The method of claim 1, wherein the VM includes at least two Virtual Central Processing Units (VCPU) executing on a corresponding at least two PCPUs including the PCPU, wherein each PCPU of the corresponding at least two PCPUs initiate a corresponding counter in response to the preemption-disable request generated by one VCPU of the at least two VCPUs.

6. The method of claim 1, wherein the hypervisor sets an initial value for the counter and notifies the VM that hypervisor preemption has been temporarily disabled when the counter status is set to active.

7. The method of claim 1, wherein a guest operating system (OS) of the VM sets an initial value for the counter and sets the counter status to active when a thread enters a critical-section, and wherein the guest OS clears the counter and sets the counter status to inactive when the thread exits the critical-section.

8. The method of claim 7, wherein the guest OS sets the counter when the guest OS locally disables interrupts.

9. The method of claim 1, wherein the one or more factors include an operational condition of the computer system, a type or category of the virtual machine, or a level of processor demand at the PCPU.

10. The method of claim 1, wherein the one or more factors include a type of the ongoing task, a number of PCPUs for which hypervisor preemption is disabled, a number of PCPUs that will be affected by the preemption-disable request, or a current workload associated with the computer system.

11. A system, comprising:
   a processor; and
   a memory including instructions that when executed by the processor perform operations comprising:
      receiving a preemption-disable request on behalf of a virtual machine (VM) running on a physical central processing unit (PCPU);
      determining that the VM is a Simultaneous Multi-Processing (SMP) VM;
      in response to receiving the preemption-disable request and determining that the VM is a SMP VM, initiating a counter on the PCPU to a counter value, wherein the counter value is dynamically determined by the system based on one or more factors;
      in response to receiving a preempting task from a hypervisor to perform on the PCPU, checking a counter status for the counter; and
      in response to the counter status being active:
         performing an ongoing task from the VM on the PCPU; and
         delaying performance of the preempting task until the counter status is inactive.

12. The system of claim 11, wherein the counter status is set to inactive in response to a timeout condition occurring a predefined amount of time or cycles after the preemption-disable request was received.

13. The system of claim 11, wherein the counter status is set to inactive in response receiving a preemption-enable request associated with the ongoing task completing a critical-section.

14. The system of claim 11, wherein the VM includes at least two Virtual Central Processing Units (VCPU) executing on a corresponding at least two PCPUs including the PCPU, wherein each PCPU of the corresponding at least two PCPUs initiate a corresponding counter in response to the preemption-disable request generated by one VCPU of the at least two VCPUs.

15. The system of claim 11, wherein the hypervisor sets an initial value for the counter and notifies the VM that hypervisor preemption has been temporarily disabled when the counter status is set to active.

16. The system of claim 11, wherein a guest operating system (OS) of the VM sets an initial value for the counter and sets the counter status to active when a thread enters a critical-section and the guest OS locally disables interrupts, and wherein the guest OS clears the counter and sets the counter status to inactive when the thread exits the critical-section.

17. A memory device that comprises a non-transitory computer-readable medium, the non-transitory computer-readable medium including instructions that when executed by a processor of a system cause the processor to perform operations comprising:
- receiving a preemption-disable request on behalf of a virtual machine (VM) running on a physical central processing unit (PCPU);
- determining that the VM is a Simultaneous Multi-Processing (SMP) VM;
- in response to receiving the preemption-disable request and determining that the VM is a SMP VM, initiating a counter on the PCPU to a counter value, wherein the counter value is dynamically determined by the system based on one or more factors;
- in response to receiving a preempting task from a hypervisor to perform on the PCPU, checking a counter status for the counter; and
- in response to the counter status being active:
  - performing an ongoing task from the VM on the PCPU; and
  - delaying performance of the preempting task until the counter status is inactive.

* * * * *